(12) United States Patent
McCauley et al.

(10) Patent No.: US 10,628,954 B1
(45) Date of Patent: Apr. 21, 2020

(54) IMPLEMENTING IMAGE ANALYSES FOR WEIGHT AND VOLUMETRIC CALCULATIONS

(71) Applicant: WALGREEN CO., Deerfield, IL (US)

(72) Inventors: Timothy P. McCauley, Evanston, IL (US); Andrea Farris, Lake Forest, IL (US)

(73) Assignee: WALGREEN CO., Deerfield, IL (US)

( * ) Notice: Subject to any disclaimer, the term of this patent is extended or adjusted under 35 U.S.C. 154(b) by 83 days.

(21) Appl. No.: 15/720,568

(22) Filed: Sep. 29, 2017

(51) Int. Cl.
*G06T 7/62* (2017.01)
*G01G 23/36* (2006.01)
*G06K 9/46* (2006.01)
*G07G 1/00* (2006.01)
*G06T 7/00* (2017.01)

(52) U.S. Cl.
CPC ............... *G06T 7/62* (2017.01); *G01G 23/36* (2013.01); *G06K 9/46* (2013.01); *G06T 7/0002* (2013.01); *G07G 1/0063* (2013.01); *G07G 1/0072* (2013.01)

(58) Field of Classification Search
CPC ............. G06T 7/62; G06T 2207/10041; G06T 2207/20104; G06T 7/10016; G06T 7/0002; G06T 2207/10004; G06T 7/001; G06T 7/20; G06T 2207/10016; G06K 9/46; G07G 1/0063; G07G 1/0072; G07G 3/003; G07G 1/0054; G06Q 30/0633; G06Q 20/20; G06Q 20/3276; G01B 11/02; G01G 19/005; G01G 23/35; G01G 23/36; G06F 3/04883; G06F 3/04842; B62B 1/266; B62B 2202/26; A47F 9/048
See application file for complete search history.

(56) References Cited

U.S. PATENT DOCUMENTS

| | | | | |
|---|---|---|---|---|
| 5,083,638 A | * | 1/1992 | Schneider | A47F 9/048 177/25.15 |
| 2004/0124598 A1 | * | 7/2004 | Williams | B62B 1/266 280/47.29 |

(Continued)

OTHER PUBLICATIONS

Spring weight scale, Youtube, 2013 https://www.youtube.com/watch?v=AFu1advEnhw (Year: 2013).*

*Primary Examiner* — Jianxun Yang
(74) *Attorney, Agent, or Firm* — Marshall, Gerstein & Borun LLP; Randall G. Rueth

(57) ABSTRACT

Techniques are disclosed for verifying one or more physical metrics to verify self-checkout procedures. When checking out, a user may scan a barcode for each product and submit an image of the bag that should contain the scanned products. The image is then analyzed to calculate various dimensions that are indicative of a cumulative weight and/or volume of the scanned products. By performing such measurements, an expected range of weights and/or volumes may be calculated and associated with the bag including each of the scanned products. The scanned product barcode data may also be used to lookup information such as weight and volume of each product, and to calculate a total weight and/or volume for all scanned products. These calculated totals may be compared to the expected range of values to verify that all scanned products have been bagged, and thus authenticate the self-checkout process.

20 Claims, 8 Drawing Sheets

(56) References Cited

U.S. PATENT DOCUMENTS

2010/0202702 A1* 8/2010 Benos .................... G01B 11/02
   382/200
2014/0214596 A1* 7/2014 Acker, Jr. .......... G06Q 30/0633
   705/26.8
2017/0200275 A1* 7/2017 McCloskey ............ G01G 23/35

* cited by examiner

| UPC Code | Product Description | Product Weight (oz) | Product Dimensions (in) | | | Calculated Volume (in³) |
|---|---|---|---|---|---|---|
| | | | L | W | H | |
| 7 12345 67890 5 | Product #1 | 22 | 2 | 8 | 10 | 160 |
| 7 12345 67892 5 | Product #2 | 14 | 4 | 6 | 4 | 96 |
| 7 12345 56890 5 | Product #3 | 3 | 1 | 2 | 6 | 12 |
| 7 12345 12890 5 | Product #4 | 0.8 | 2 | 2 | 2 | 8 |
| 7 12345 34890 5 | Product #5 | 10 | 4 | 5 | 6 | 120 |
| 7 12785 67890 5 | Product #6 | 19 | 10 | 15 | 2 | 300 |
| 7 12935 67890 5 | Product #7 | 20 | 5 | 6 | 8 | 240 |
| 7 12215 67890 5 | Product #8 | 2 | 1 | 6 | 8 | 48 |
| 7 12350 67890 5 | Product #9 | 55 | 2 | 8 | 9 | 144 |
| 7 12366 67890 5 | Product #10 | 600 | 12 | 18 | 6 | 1296 |
| 7 12322 67890 5 | Product #11 | 110 | 14 | 2 | 6 | 168 |
| 7 12333 67890 5 | Product #12 | 154 | 4 | 5 | 6 | 120 |
| 7 12344 67890 5 | Product #13 | 75 | 10 | 2 | 3 | 60 |
| 7 12355 67890 5 | Product #14 | 96 | 12 | 5 | 6 | 360 |
| 7 12366 67890 5 | Product #15 | 33 | 1 | 10 | 10 | 100 |
| 7 12377 67890 5 | Product #16 | 65 | 14 | 5 | 3 | 210 |

FIG. 4

IMPLEMENTING IMAGE ANALYSES FOR WEIGHT AND VOLUMETRIC CALCULATIONS

TECHNICAL FIELD

The present disclosure relates generally to mobile self-checkout procedures and, more particularly, to using image analysis used to prevent theft in accordance with mobile self-checkout procedures.

BACKGROUND

Traditionally, retailers have relied upon conventional checkouts, in which a customer has items individually scanned and bagged by an employee. Because conventional checkouts require several employees individually assisting customers, retailers have recently introduced self-checkout systems. Self-checkout systems are typically overseen by a lesser number of employees than would be required for a traditional checkout system. For example, a self-checkout system may have several kiosks that allow customers to physically scan their own items, much like a store employee would do, and then pay for those items via a user interface. In doing so, self-checkout systems allow a single store employee to oversee a number of these kiosks at the same time, and only render assistance when needed.

However, customers may take advantage of self-checkout systems to circumvent security measures. For instance, people may pretend to scan an item, place the unscanned item in a bagging are, and leave the store without paying for the item. This type of activity may be particularly difficult for store employees to detect when the user scans less expensive items, and pretends to scan costlier ones. To counter theft, many self-checkout kiosks use scales that sense the weight of scanned items and verify whether an item, upon being scanned, is actually placed in a bagging area. This solution, however, requires specialized equipment to be installed as part of each self-checkout kiosk, increasing its cost and reducing the advantage of saving labor costs in the first place. Furthermore, self-checkout systems still require a dedicated store employee to oversee the self-checkout area, which reduces, but does not completely eliminate, labor costs. As a result, self-checkout systems provide some advantages over traditional checkouts, but still introduce several drawbacks.

SUMMARY

Various embodiments are described herein that facilitate mobile self-checkout with enhanced security measures. To do so, a user may utilize his own smartphone to facilitate store checkout, without the need for the retailer to have self-checkout kiosks. Instead, the retailer may dedicate an area of the store for mobile self-checkout, which may include a set of affixed fasteners such as hooks or pegs. The customer may use an application installed on his or her smartphone to scan the barcode of each item being purchased with the smartphone's camera in accordance with an installed application. The user may then bag the scanned items, hang the bag on the affixed fastener, and take a picture of the bag containing the scanned items.

In the embodiments described herein, the smartphone may transmit data, which is then received by one or more back-end components and used to verify that the bagged items match those that are scanned. This transmitted data may include product data from the barcode scans (e.g., Universal Product Codes (UPCs)) and the image of the hanging bag containing the scanned items. The one or more back-end components may lookup information associated with each of the scanned items (e.g., using each item's UPC) to determine the weight, dimensions, and other information associated with each scanned item. The one or more back-end components may then calculate a total bag weight and volume using this information.

Separately, the one or more back-end components may analyze an image of the hanging bag to measure various dimensions that would be impacted by increasing bag weight and/or volume. In various embodiments, these dimensions may be of the bag itself or a portion of the affixed fastener such as the extension of an integrated spring, when applicable. Moreover, the embodiments include the retailer providing a dimensional chart adjacent to or behind the affixed fastener, which may act as a reference guide used to perform these measurements. Using the calculated dimensions, a range of weights and/or volumes may be determined and used to verify whether the user has, in fact, placed each of the scanned items in the bag. This may be done, for example, by comparing the total bag weight and/or volume to a range of expected weights and/or volumes derived from the calculated dimensions associated with the image analysis. The one or more back-end components may then send an appropriate notification to the smartphone and/or other component within the retail store based upon whether the user's mobile self-checkout was successful (i.e., the total bag weight and/or volume is within the range of expected weights and/or volumes calculated from the by analyzing the bag image) or unsuccessful (i.e., the total bag weight and/or volume is not within the range of expected weights and/or volumes calculated from the by analyzing the bag image).

BRIEF DESCRIPTION OF THE DRAWINGS

The Figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIG. 4 illustrates an example set of information used to determine the weight and volume of various products, according to an embodiment;

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
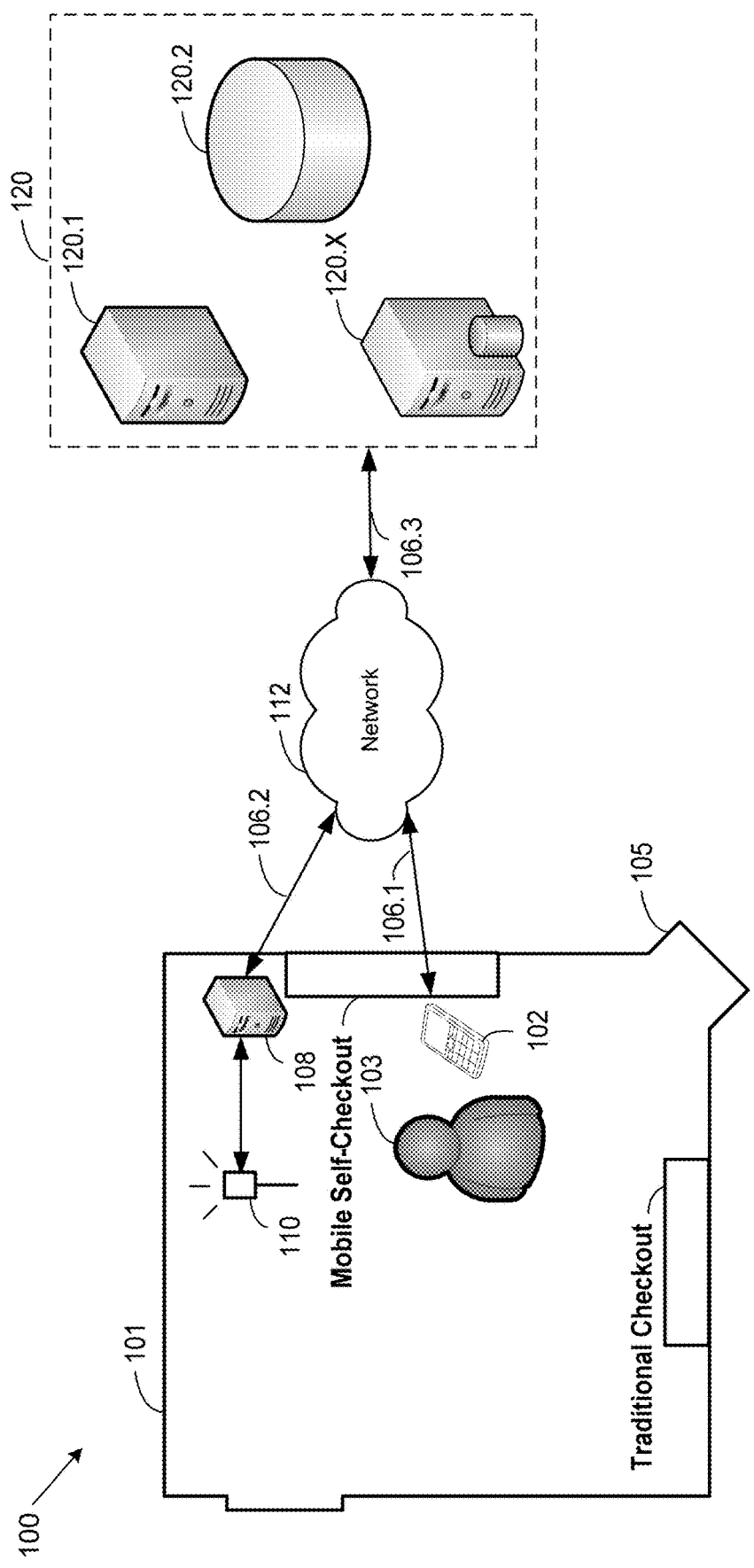
FIG. 1 is a block diagram of an example mobile self-checkout system 100 in accordance with an embodiment of the present disclosure.

FIG. 1 is a block diagram of an example mobile self-checkout system 100, in accordance with an embodiment of the present disclosure. In an embodiment, mobile self-checkout system 100 ("system 100") may include a retail store 101, a mobile computing device 102, which may be operated by a user 103, a communication network 112, and one or more back-end components 120.

For the sake of brevity, system 100 is illustrated as including a single retail store 101, a single mobile computing device 102, a single user 103, a single network 106, a single set of one or more back-end components 120, etc. However, the embodiments described herein may include any suitable number of the components illustrated in FIG. 1 and/or elsewhere as discussed herein. For example, back-end components 120 may communicate with several mobile computing devices 102, each of which being operated by a respective user 103, to receive various types of information used to verify a mobile self-checkout, as further discussed herein. Moreover, for ease of explanation, the embodiments disclosed herein generally refer to one or more back-end components, such as back-end components 120, for example, as performing the various calculations and other functions to facilitate the verification a mobile self-checkout. However, it will be understood that any suitable function described herein is not limited to the particular component for which its functionality is described. For instance, any suitable function described herein with reference to one or more of back-end components 120 may additionally or alternatively be performed by one or more mobile computing devices 102, and vice-versa.

Retail store 101 may be any suitable type of store in which various items may be purchased. As used herein, the terms "items," "products," and "objects" may be used interchangeably in this regard. For example, user 103 may be a customer of the retail store 101, and enter the retail store 101 via the store front 105. In various embodiments, the retail store 101 may include a traditional checkout and a mobile self-checkout, each functioning as a respective point of sale and each being available as a checkout option for the user 103, although the embodiments described herein are provided with reference to the mobile self-checkout option. As further discussed, the mobile self-checkout may be implemented as a dedicated area of the retail store 101 that is reserved for this purpose, and thus include any suitable number and/or type of signage, affixed fasteners, dimensional charts, retailer computing devices 108, retailer alert systems 110, etc.

The retail store 101 may optionally include one or more retailer computing devices 108 and/or one or more retailer alert systems 110. These components may be particularly useful, for example, when a retailer wants to provide an added level of security or awareness for customers and/or employees with regards to the mobile self-checkout system. For example, when using the mobile self-checkout system, the user 103 may receive a notification regarding whether the verification of a mobile self-checkout was successful, as further discussed herein. In any event, embodiments include retailer computing device 108 optionally receiving these notifications, as well as other types of information. Retailer computing device 108 may optionally control one or more retailer alert systems 110, which may be implemented as tower lights, alarms, audible alerts, speakers, video screens, etc., to communicate whether a mobile self-checkout has been verified. In this way, the mobile self-checkout may include an added level of security to prevent theft when mobile self-checkout is not verified, or to otherwise provide assistance to a customer.

Communication network 112 may be configured to facilitate communications between one or more mobile computing devices 102, retailer computing devices 108, and/or one or more back-end components 120 using any suitable number of wired and/or wireless links. Communication network 112 may support communications between these various components in accordance with any suitable number and/or type of communication protocols, which may be the same or different communication protocols based upon the particular components for which communication is being supported. These wired and/or wireless links may be represented in FIG. 1 as links 106.1-106.3, for example, for ease of explanation. Communication network 112 may include any suitable number of nodes, additional wired and/or wireless networks, etc., in various embodiments, to facilitate this functionality.

For example, in an embodiment, communication network 112 may be implemented as a local area network (LAN), a metropolitan area network (MAN), a wide area network (WAN), or any suitable combination of local and/or external network connections. To provide further examples, communications network 112 may include wired telephone and cable hardware, satellite, cellular phone communication networks, femtocells, access points, macrocells, etc. In an embodiment, communication network 112 may provide one or more mobile computing devices 102 and/or retailer computing devices 108 with connectivity to network services, such as Internet services, for example, and/or support application programming interface (API) calls between one or more backend computing devices 120, one or more mobile computing devices 102, and/or retailer computing devices 108.

To this end, mobile computing device 102 and/or retailer computing device 108 may be configured to communicate with one another and/or with back-end computing devices 120 using any suitable number and/or type of communication protocols, such as Wi-Fi, cellular, BLUETOOTH, NFC, RFID, etc. For example, mobile computing device 102 may be configured to communicate with communication network 112 using a cellular communication protocol to send data to and/or receive data from one or more back-end components 120 using links 106.1 and 106.3. To provide another example, retailer computing device 108 may be configured to communicate with one or more back-end components 120 via an Internet protocol using links 106.2 and 106.3.

In various embodiments, mobile computing device 102 may be implemented as any suitable type of computing and/or client device, such as a smartphone, for example. Although mobile computing device 102 is illustrated in FIG. 1 as a phone, mobile computing device 102 may be implemented as any suitable communication device. For example, mobile computing device 102 may be implemented as a personal digital assistant (PDA), a tablet computer, a laptop computer, a wearable electronic device, etc.

As further discussed below, the user 103 may use the mobile computing device 102 to individually scan a barcode associated with each product to be purchased from the retailer. After scanning each product, user 103 may bag the products, hang the bag from an affixed fastener, and take a picture of the bag containing each of the scanned products. Additionally, the mobile computing device 102 may transmit data to the one or more back-end components 120 via communication network 112 to facilitate the verification of the mobile self-checkout (i.e., whether the user 103 has actually placed all the scanned items into the bag). The data transmitted by the mobile computing device 102 may therefore include, for example, any suitable type of information used by one or more back-end components 112 to make this determination. For example, as will be further discussed below, the mobile computing device 102 may transmit data such as unique information identifying each scanned product, the image of the hanging bag containing the scanned items, data uniquely identifying the user 103, etc.

Furthermore, data received by the mobile computing device 102 from one or more back-end components 120 may include any suitable type information used to notify the user 103 regarding the verification of the mobile self-checkout. For example, as will be further discussed below, the mobile computing device 102 may receive notifications, messages, images, alerts, etc., indicating to the user whether to leave the store or to request additional assistance from an employee of the retailer 101.

One or more back-end components 120 may include any suitable number of components configured to receive data from and/or send data to one or more of retailer computing device 108 and/or mobile computing device 102 via communication network 112 using any suitable number of wired and/or wireless links. In various embodiments, one or more back-end components 120 may be configured to execute one or more applications in conjunction with, or to otherwise support, one or more applications executed on mobile computing device 102, and to perform one or more functions associated with the embodiments as discussed herein.

For example, as shown in FIG. 1, one or more back-end components 120 may include one or more external computing devices such as servers 120.1, databases 120.2, and/or database servers 120.X. Again, although FIG. 1 illustrates one or more back-end components 120 as including only three different types of back-end components, embodiments include one or more back-end components 120 implementing any suitable number X and/or type of back-end components to facilitate the appropriate functions of the embodiments as described herein.

For example, server 120.1 may be implemented as any suitable number of web servers configured to provide Internet communications to one or more of retailer computing device 108 and/or mobile computing devices 102, to process API service calls, and/or to support one or more applications installed on one or more of mobile computing devices 102. To provide another example, database server 120.X may be implemented as any suitable number of servers that are configured to access data from database 120.2, which may store any suitable type of data as further discussed below.

Furthermore, one or more back-end components 120 may store and/or access secure data that is of a private, proprietary, and/or sensitive nature. As a result, various embodiments of one or more back end components 120, communication network 112, and/or mobile computing device 102 may implement appropriate security protocols such as encryption, secure links, network authentication, firewalls, etc., to appropriately protect such secure data.

In various embodiments, one or more of back-end components 120 may communicate with database 120.2 to store data to and/or to read data from database 120.2 as needed to facilitate the appropriate functions of the embodiments as described herein. Database 120.2 may be configured to store any suitable relevant data as described in the embodiments presented herein related to the operation of system 100. Such data may include, for example, a user profile that includes user information, payment information, contact information, a history of previous store visits (e.g., a history of store locations, when they were visited, and how long they were visited), UPC codes associated with products sold by the retailer 101 and their associated descriptions, weights, dimensions, volumes, etc., the current and/or tracked locations of a particular user (e.g., user 103) based upon that user's portable computing device (e.g., the location of portable computing device 102), etc.

Figure 2:
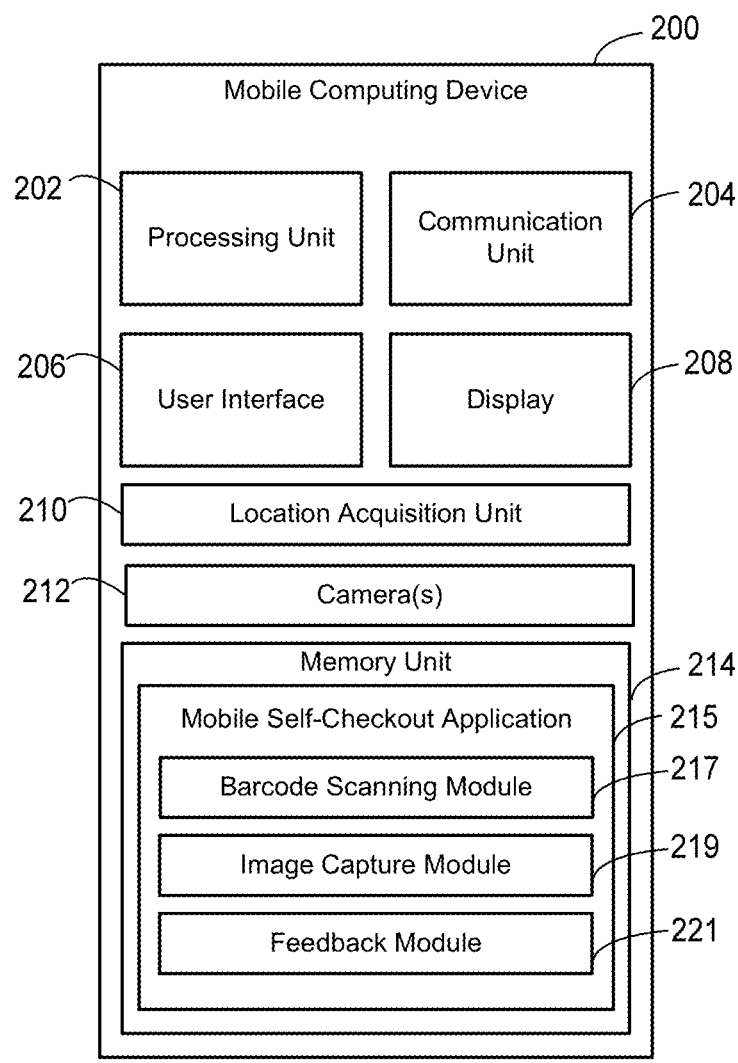
FIG. 2 is a block diagram of an example mobile computing device 200, according to an embodiment.

FIG. 2 is a block diagram of an example mobile computing device 200, according to an embodiment. In an embodiment, mobile computing device 200 may be an implementation of mobile computing device 102, for example, as shown in FIG. 1. In an embodiment, mobile computing device 200 may include a processing unit 202, a communication unit 204, a user interface 206, a display 208, a location acquisition unit 210, one or more cameras 212, and a memory unit 214. Mobile computing device 200 may include more, less, or alternate components, including those discussed elsewhere herein.

Generally speaking, mobile computing device 200 may be configured to execute various installed applications to perform one or more functions of the various embodiments described herein. For example, a mobile self-checkout application 215, which will be further discussed below, may be downloaded and installed onto the mobile computing device 200. The mobile self-checkout application 215 may be configured to facilitate various functions, such as collecting, receiving, and/or transmitting data, or otherwise supporting communications between mobile computing device 200 and one or more back-end components (e.g., back-end components 120), activating one or more cameras 212 to scan product barcodes and/or take pictures, etc.

To this end, communication unit 204 may be configured to facilitate data communications between mobile computing device 200 and one or more other communication devices and/or networks in accordance with any suitable number and/or type of communication protocols. In various embodiments, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, antennas, etc. For example, communication unit 204 may be configured to facilitate communications between mobile computing device 200 and one or more back-end components (e.g., one or more back-end components 120, as shown in FIG. 1) via one or more communication networks.

User interface 206 may be configured to facilitate user interaction with mobile computing device 200. For example, user interface 206 may include a user-input device such as an interactive portion of display 208 (e.g., a "soft" keyboard displayed on display 208), an external hardware keyboard configured to communicate with mobile computing device 200 via a wired or a wireless connection (e.g., a BLUETOOTH keyboard), an external mouse, or any other suitable user-input device.

Display 208 may be configured to present information to a user and allow a user to interact with the mobile computing device 200, for example, to execute the mobile self-checkout application 215. Therefore, embodiments include display 208 being implemented as any suitable type of display to facilitate user interaction with mobile computing device 200. For example, display 208 may be implemented as a capacitive touch screen display, a resistive touch screen display, etc. In various aspects, display 208 may be configured to work in conjunction with user-interface 206 and/or processing unit 202 to detect user inputs upon a user selecting a displayed interactive icon or other graphic, to identify user selections of objects displayed via display 208, to display information in accordance with the mobile self-checkout application 215, etc.

Location acquisition unit 210 may be implemented as any suitable device configured to generate location data indicative of a current geographic location of mobile computing device 200. In an embodiment, location acquisition unit 210 may be implemented as a satellite navigation receiver that works with a global navigation satellite system (GNSS) such as the global positioning system (GPS) primarily used in the United States, the GLONASS system primarily used in the Russian Federation, the BeiDou system primarily used in China, and/or the Galileo system primarily used in Europe.

Location acquisition unit 210 and/or processing unit 202 may be configured to receive navigational signals from one or more satellites, and to calculate a geographic location of mobile computing device 200 using these signals. Location acquisition unit 210 may include one or more processors, controllers, or other computing devices and memory to calculate the geographic location of mobile computing device 200 with or without processing unit 202. Alternatively, location acquisition unit 210 may utilize components of processing unit 202. Thus, processing unit 202 and location acquisition unit 210 may be combined or be separate or otherwise discrete elements.

Camera(s) 212 may be implemented as any suitable number and/or type of image and/or video capture device. For example, camera(s) 212 may include a rear-facing and/or a front-facing camera utilized by and/or integrated as part of mobile computing device 200. In various embodiments, mobile self-checkout application 215 and/or processing unit 202 may communicate with, control, and/or utilize camera(s) 212 to perform various functions, as further discussed below.

Processing unit 202 may be implemented as any suitable type and/or number of processors, such as a host processor for the relevant device in which mobile computing device 200 is implemented, for example. Processing unit 202 may be configured to communicate with one or more of communication unit 204, user interface 206, display 208, location acquisition unit 210, camera(s) 212, and/or memory unit 214 to send data to and/or to receive data from one or more of these components, and/or to store data to and/or to read data from one or more of these components.

In accordance with various embodiments, memory unit 214 may be a computer-readable non-transitory storage device, and may include any combination of volatile (e.g., a random access memory (RAM)), or a non-volatile memory (e.g., battery-backed RAM, FLASH, etc.). In an embodiment, memory unit 214 may be configured to store instructions executable by processing unit 202. These instructions may include machine readable instructions that, when executed by processing unit 202, cause processing unit 202 to perform various acts.

In an embodiment, mobile self-checkout application 215 is a portion of memory unit 214 configured to store instructions, that when executed by processing unit 202, cause processing unit 202 to perform various acts in accordance with applicable embodiments as described herein. For example, instructions stored in the mobile self-checkout application 215 may facilitate processing unit 202 performing functions such as allowing a user to scan (e.g., via camera(s) 212) one or more product barcodes, to capture images of a bag filled with scanned products to be purchased, to transmit data representative of the captured images and scanned barcodes, to receive one or more notifications from one or more back-end components (e.g., back-end components 120), to display information associated with received notifications and/or other information, etc.

Moreover, the mobile self-checkout application 215 may also support the communication of user information to one or more back-end components (e.g., back-end components 120). This user information may include any suitable type of information to identify a user (e.g., user 103) who is currently using the mobile self-checkout application 215 to purchase products, such that the user may later be matched to her user profile data. Again, this user profile may be stored in one or more back-end components (e.g., back-end components 120), and may include various types of information associated with a particular user. To provide an illustrative example, upon installing and launching the mobile self-checkout application 215, a user may be prompted to enter login information and/or complete an initial registration process to create a user profile. The user may initially create his user profile with a retailer upon first launching the application, through a registration process via a website, over the phone, etc.

In an embodiment, upon a user providing her login information via the mobile self-checkout application 215, one or more back-end components (e.g., back-end components 120) may link the user's login information to other information that may be used to expedite the mobile self-checkout process. For example, the mobile self-checkout application 215 may enable mobile computing device 200 to communicate with one or more back-end components (e.g., back-end components 120) as part of an API services call to verify that the bagged items match those that have been scanned and, if so, to utilize stored payment information to complete a payment transaction.

In some embodiments, mobile self-checkout application 215 may reside in memory unit 214 as a default application bundle that may be included as part of the operating system (OS) of mobile computing device 200. But in other embodiments, mobile self-checkout application 215 may be installed on mobile computing device 200 as one or more downloads, such as an executable package installation file downloaded from a suitable application store via a connection to the Internet.

For example, mobile self-checkout application 215 may be stored in any suitable portion of memory unit 214 upon installation of a package file downloaded in such a manner. Examples of package download files may include downloads via the iTunes store, the Google Play Store, the Windows Phone Store, downloading a package installation file from another computing device, etc. Once downloaded, mobile self-checkout application 215 may be installed on mobile computing device 200 such that, upon installation of mobile self-checkout application 215, memory unit 214 may allocate various modules for different application functions, such as barcode scanning module 217, image capture mobile 219, and feedback module 221, for example.

In other words, the various modules of mobile self-checkout application 215 may represent portions of mobile self-checkout application 215 that are associated with different functions. These portions may represent, for example, one or more algorithms, logic and code, executable instructions, programs, etc., to carry out specific tasks associated with the operation of mobile self-checkout application 215, which are modularized in FIG. 2 for ease of explanation.

For example, barcode scanning module 217 may be a portion of memory unit 214 that, when executed by processing unit 202 in accordance with the mobile self-checkout application 215, enables mobile computing device 200 to "scan" barcodes or various products to be purchased. To provide an illustrative example, mobile self-checkout application 215 may open a rear-facing camera (e.g., one of camera(s) 212) allowing a user to frame a product barcode within the camera's viewer. The barcode scanning module 217 may then include instructions to allow the processing unit 202 to execute any suitable type of image recognition process to identify the barcode image, read, and store the data embedded into the barcode in any suitable portion of memory unit 214. In various embodiments, mobile computing device 200 may scan barcode data represented by any suitable number and/or type of barcodes, such as linear barcodes and 2-D barcodes (e.g., QR codes, data matrix barcodes, etc.).

To provide another example, image capture module 219 may be a portion of memory unit 214 that, when executed by processing unit 202 in accordance with the mobile self-checkout application 215, enables mobile computing device 200 to capture and store various images associated with a mobile self-checkout process. These one or more images may be captured, for example, in response to user input received via user interface 206. For instance, a user may scan multiple product barcodes, bag the products, and hang the bag on an affixed fastener. The mobile self-checkout application 215 may present a user with various options via display 208 to allow the user to select when all products have been scanned. Upon receiving a user input indicating that a user has finished scanning the items, the display 208 may also present instructions informing the user where to hang the filled bag, and prompting the user to take a picture of the hanging bag. Upon receiving a response to the prompt confirming that an image should be taken, instructions stored in image capture module 219 may allow a user to operate the camera(s) 212, capture an image of the hanging bag, and store the image in any suitable portion of memory unit 214.

Additionally, embodiments include instructions stored in image capture module 219 facilitating other images being acquired that are associated with the mobile self-checkout process. For example, a front-facing camera may be activated, and video or one or more pictures may be acquired and stored in any suitable portion of memory unit 214. Such images may be particularly useful, for example, to later identify a user to authorities, in the event that the user left the store without paying for the items and/or when the mobile self-checkout process has not been verified but the user left the store anyway.

In embodiments, mobile self-checkout application 215 may further cause the mobile computing device 200 to transmit data associated with a mobile self-checkout process to one or more back-end components (e.g., back-end components 120). This data may include any suitable type of information associated with a particular mobile self-checkout, such as barcode data from scanning products, image data representing one or more images of the hanging bag full of scanned products, image data associated with one or more images obtained via the front-facing camera, user data identifying the particular user, store information identifying the particular retail store, geographic location data, which may be used to identify the retail store, etc.

As further discussed below, data transmitted by the mobile computing device 200 may be received and utilized by one or more back-end components (e.g., back-end components 120) to determine whether a bag actually contains each of the scanned products, thus verifying the mobile self-checkout process. Based upon whether the mobile self-checkout process has been verified, the one or more back-end components (e.g., back-end components 120) may send various notifications to the mobile computing device 200 for presentation to the user.

For example, feedback module 221 may be a portion of memory unit 214 that, when executed by processing unit 202 in accordance with the mobile self-checkout application 215, enables mobile computing device 200 to display feedback to the user based upon the particular type of notification that is received. For instance, if the mobile self-checkout process has been verified, then feedback module 221 may cause the display 208 to present a message indicating that the mobile self-checkout was successful, and that the user may now exit the store. To provide another example, in the event that the mobile self-checkout process is not verified, then feedback module 221 may cause the display 208 to present a message indicating that the mobile self-checkout was not successful, to request help from a retail store employee, to start the process over and try again, etc.

Figure 3:
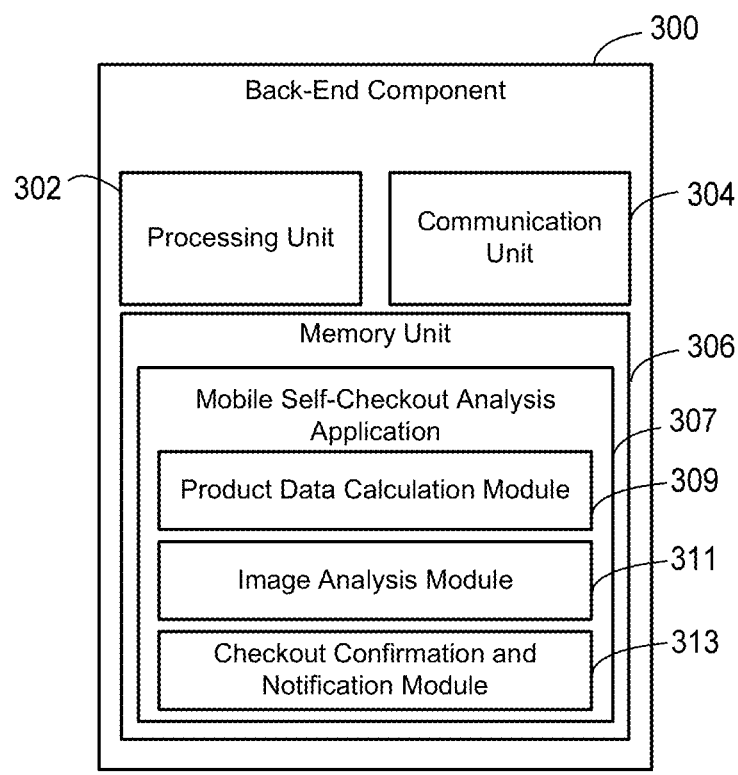
FIG. 3 is a block diagram of an example back-end component 300, according to an embodiment.

FIG. 3 is a block diagram of an example back-end component 300, according to an embodiment. In an embodiment, back-end component 300 may be an implementation of one or more back-end components 120, for example, as shown in FIG. 1. In an embodiment, back-end component 300 may include a processing unit 302, a communication unit 304, and a memory unit 306. Back-end component 300 may include more, less, or alternate components, including those discussed elsewhere herein.

Generally speaking, back-end component 300 may be configured to execute various installed applications to perform one or more functions of the embodiments described herein. For example, a mobile self-checkout analysis application 307, which will be further discussed below, may be installed onto the back-end component 300. The mobile self-checkout analysis application 307 may be configured to facilitate various functions, such as receiving data from a mobile computing device during a mobile self-checkout process, identifying product information from barcodes scanned via a mobile computing device, calculating a total weight and/or volume of multiple scanned products, receiving image data including a bag containing the scanned products, performing an image analysis on the image of the bag, calculating one or more dimensions within the image and a range of expected weights and/or volumes, determining whether the total weight and/or volume associated with the barcode information is within the range of expected weights and/or volumes, determining whether the mobile self-checkout process has been verified, transmitting notifications to a mobile computing device, etc.

To facilitate communications between the back-end component 300 and other computing devices and/or networks (e.g., mobile computing devices such as mobile computing device 200, other back-end components such as back-end components 120, retailer computing devices such as retailer computing device 108, communication networks such as communication network 112, etc.), communication unit 304 may be configured to support data communications in accordance with any suitable number and/or type of communication protocols. In various embodiments, communication unit 304 may be implemented with any suitable combination of hardware and/or software to facilitate this functionality. For example, communication unit 304 may be implemented with any suitable number of wired and/or wireless transceivers, network interfaces, physical layers (PHY), ports, antennas, etc.

Processing unit 302 may be implemented as any suitable type and/or number of processors, such as a host processor for the relevant device in which back-end component 300 is implemented, for example. Processing unit 302 may be configured to communicate with one or more of communication unit 304 and/or memory unit 306 to send data to and/or to receive data from one or more of these components, and/or to store data to and/or to read data from one or more of these components In accordance with various embodiments, memory unit 306 may be a computer-readable non-transitory storage device, and may include any combination of volatile (e.g., a random access memory (RAM)), or a non-volatile memory (e.g., battery-backed RAM, FLASH, etc.). In an embodiment, memory unit 306 may be configured to store instructions executable by processing unit 302. These instructions may include machine readable instructions that, when executed by processing unit 302, cause processing unit 302 to perform various acts.

In an embodiment, mobile self-checkout analysis application 307 is a portion of memory unit 306 configured to store instructions, that when executed by processing unit 302, cause processing unit 302 to perform various acts in accordance with applicable embodiments as described herein. The various modules of mobile self-checkout analysis application 307 may represent portions of mobile self-checkout analysis application 307 that are associated with different functions. These portions may represent, for example, one or more algorithms, logic and code, executable instructions, programs, etc., to carry out specific tasks associated with the operation of mobile self-checkout analysis application 307, which are modularized in FIG. 3 for ease of explanation.

For example, product data calculation module 309 may be a portion of memory unit 306 that, when executed by processing unit 302 in accordance with the mobile self-checkout analysis application 307, enables back-end component 300 to identify the weight of one or more scanned products based upon data received from a mobile computing device during a mobile self-checkout, as previously discussed. An illustrative example of this functionality is provided with reference to FIG. 4, which illustrates an example set of information used to determine data associated with various products (e.g., the weight and volume), according to an embodiment.

For example, FIG. 4 shows a table 400 for 16 different products, which may represent a database of available information accessible by the back-end component 300. This data may be stored, for example, in one or more other databases, storage devices, back-end components, etc., as discussed above with reference to FIG. 1. As shown in FIG. 4, table 400 includes only 16 products for purposes of brevity, but it will be understood that back-end component 300 may access data corresponding to any suitable number of retailer products, which may be hundreds or thousands of products stocked or otherwise sold by the retailer.

Continuing this example, assume that a customer uses a mobile computing device during a mobile self-checkout process, as discussed above. In doing so, further assume that the user intends to purchase products associated with products #1, #2, #5, #6, and #15. Thus, the user may scan a barcode for each of these products via the camera associated with his mobile computing device running the mobile self-checkout application 215, and data associated with each barcode, such as the UPC information shown in table 400, for example, would be transmitted by the mobile computing device to the back-end component 300.

In embodiments, when this data is received by the back-end component 300, instructions stored in product data calculation module 309 may facilitate back-end component 300 using the UPC (or other unique identifying information about each scanned product) to lookup matching products to ascertain information such as product weight, dimensions, and/or volume, for example. In the event that volume data is not available, back-end component 300 may calculate the volume of each product based upon its respective dimensions. In this example, using the products #1, #2, #5, #6, and #15, back-end component 300 would calculate a total weight for each of these products as 22+14+10+19+33=98 oz. (about 6 pounds). Likewise, back-end component 300 may calculate a total volume for each of these products as 160+96+120+300+100=816 in$^3$ (about 3.3 gallons).

Additionally or alternatively, the stored data that is accessed by the back-end component 300 may include additional information other than what is shown in Table 400. For example, the product description column may include information such as a manufacturer, color, shape, etc., of each product. In various embodiments, the back-end component 300 may use any suitable combination of weight, dimensions, volume, or other such information in accordance with one or more image analysis techniques to verify the mobile self-checkout, as further discussed below.

In an embodiment, image analysis processing module 311 is a portion of memory unit 306 configured to store instructions, that when executed by processing unit 302, cause processing unit 302 to perform various acts in accordance with the applicable embodiments as described herein. In various embodiments, these instructions may facilitate processing unit 302 performing any suitable number and/or type of image analyses to calculate one or more dimensions within one or more images of a hanging bag, which have been captured by a user via a mobile computing device and transmitted to back-end component 300.

Using instructions stored in image analysis processing module 311, back-end component 300 may calculate one or more dimensions within an image of a hanging bag that may be used to calculate one or more metrics to verify a mobile self-checkout process. For example, image detection may be executed via OpenCV, a two or three-dimensional image processing algorithm, any suitable edge detection algorithm, any suitable algorithm configured to determine pixels per metric and/or to calculate one or more dimensions of an object based upon an image of the object, etc.

In various embodiments, which are described in greater detail below, the metrics may include calculated from the one or more dimensions within the image of the hanging bag may include any suitable type of information, or combinations thereof, relating to one or more physical measurements that may be identified from image analysis. Some of these metrics may include, for example, cumulative bag weight (i.e., the total weight of the bag with scanned products inside of it), the cumulative bag volume (i.e., the total volume of the bag with scanned products inside of it), the color of one or more products, the shape of one or more products, etc. In various embodiments, one or more of these metrics, or combinations thereof, may be compared to threshold values, maximum values, a range of expected values (e.g., from information obtained via UPC lookup, as described above), etc., to verify a mobile self-checkout process. By combining several metric comparisons (e.g., weight and volume), a retailer can customize the level of security and control over the mobile self-checkout process.

Figure 5A:
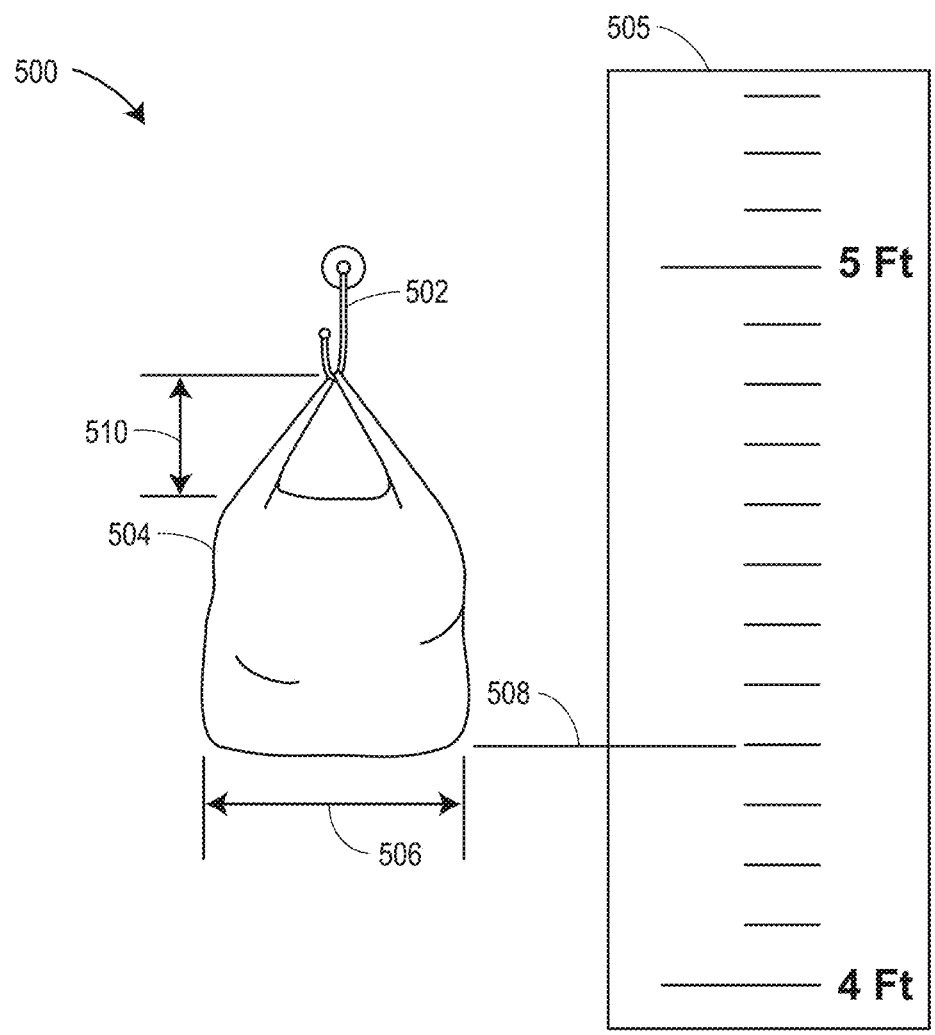
FIGS. 5A-5C are example illustrations of hanging bag images used to determine whether bagged items match those that have been scanned, according to an embodiment.
Figure 5B:
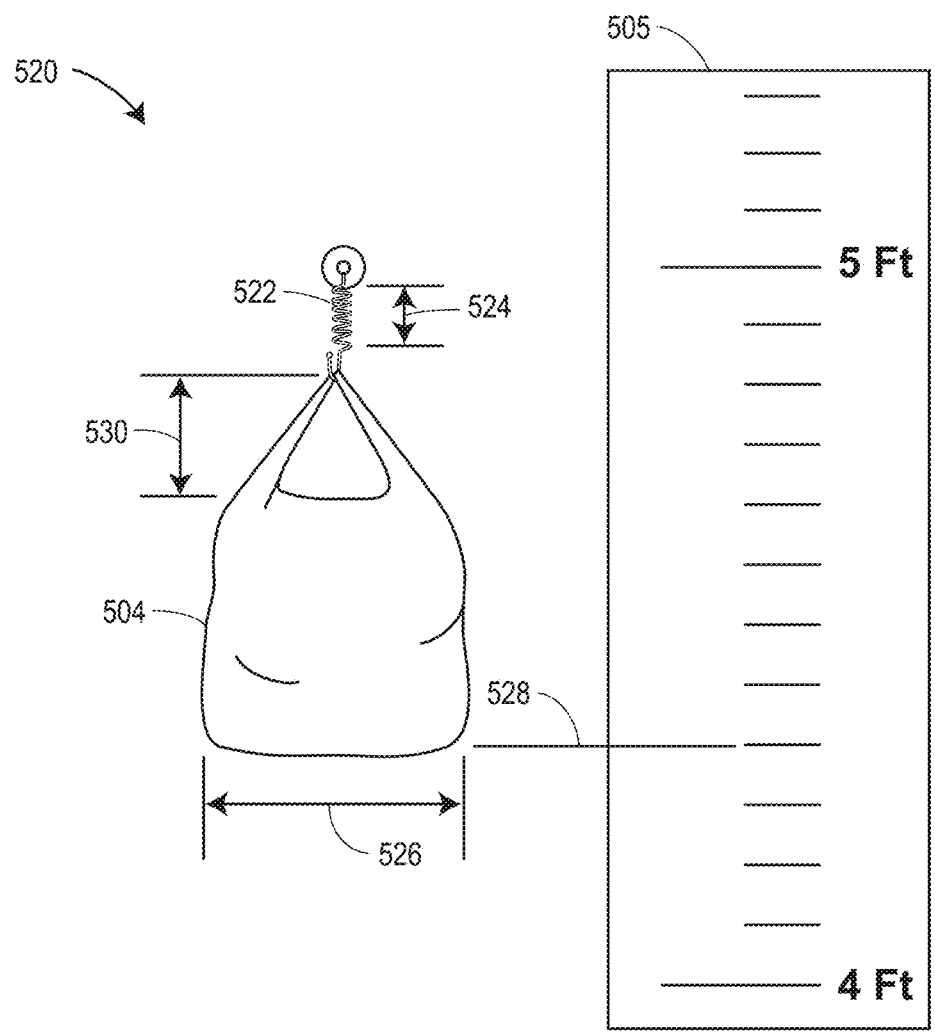
Figure 5C:
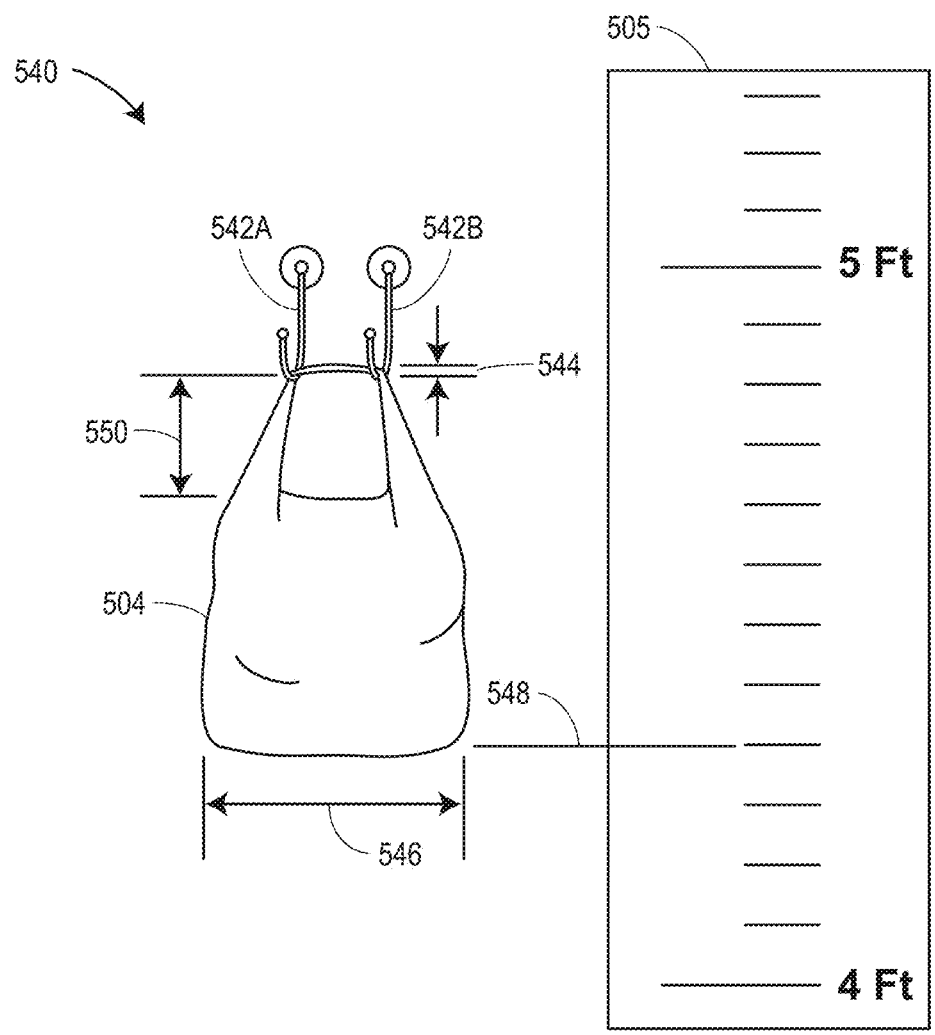

To provide an illustrative example, reference is continuously made to FIGS. 5A-5C, which show example illustrations of hanging bag images used to verify a mobile self-checkout. Each of FIGS. 5A-5C indicates a different technique for hanging a bag filled with scanned items, although these illustrations are provided as examples and not limitation, and it will be understood that many other variations are within the spirit and scope of the embodiments as disclosed herein.

As shown in FIG. 5A, the image 500 includes a single affixed fastener 502, from which bag 504 is hung while filled with various scanned items. In the example shown in FIG. 5A, the affixed fastener is a static object such as a peg or hook, which is setup in an area of the retail store used for mobile self-checkouts (e.g., the mobile self-checkout area as shown and discussed above with reference to FIG. 1). For ease of explanation, it is assumed in each of the examples shown in FIGS. 5A-5C that the bag 504 contains the same scanned products as discussed above (i.e., products #1, #2, #5, #6, and #15).

Each of FIGS. 5A-5C also includes a dimensional chart 505, which is shown as a height chart indicating vertical measurements in a region next to the hanging bag 504. Although shown in each of FIG. 5A-5C as a height chart, embodiments include the dimensional chart 505 being implemented in any suitable manner to function as a reference object of known dimensions, to allow back-end component 300 to calculate one or more dimensions via image analysis of images 500, 520, and 540, as the case may be. For example, the dimensional chart 505 may be positioned behind or adjacent to the affixed fastener(s) (502, 522, 542A-B), and be implemented as a grid having tick marks indicating various known dimensions in one or more directions, as vertical or horizontal stripes having known thicknesses, as one or more reference objects having known dimensions, etc. Regardless of the implementation of the dimensional chart 505, embodiments include processing unit 302 executing instructions stored in image analysis processing module 311 to calculate one or more dimensions that are indicative of a cumulative weight of the bag 504 containing scanned products (i.e., products #1, #2, #5, #6, and #15). In various embodiments, these dimensions may be associated with the bag 504 and/or the affixed fastener from which the bag is hanging.

For instance, one or more of the dimensions discussed herein with respect to the bag 504 and/or the affixed fasteners 502, 522, 542A-B, etc., may be calculated using the dimensional chart 505 as a reference guide. For example, a number of pixels in the image may be associated with a portion of a known dimension indicated on the dimensional chart 505 to calculate a pixel-to-length ratio, which may then be used to derive other dimensions within the image via application of the pixel-to-length ratio.

These measured dimensions within the image may be indicative, for example, of portions of the bag 504 that may stretch more for a heavier bag than a lighter one, which may be reflected as a change in the overall vertical bag drop (508) and/or a change in the length of the handles of the bag while hanging due to being stretched in the vertical direction (510). Furthermore, the horizontal compression of the bag 504 may also be measured (506), which may also change based upon the weight of the products contained in the bag 504.

To provide another example with reference to FIG. 5B, the image 520 may represent an image captured during a mobile self-checkout system using a spring-loaded affixed fastener 522. In such a case, embodiments include calculating the extension length 524 of the spring, and using this dimension to calculate an expected range of weights of the bag 504 based upon known physical properties of the spring (e.g., the spring constant k). In the setup shown in FIG. 5B, other dimensions associated with the bag 504 may additionally or alternatively be calculated, as discussed above with reference to FIG. 5A, such as the horizontal compression of the bag 504 (526), the overall vertical bag drop (528), a length of the handles of the bag while hanging due to being stretched in the vertical direction (530), etc.

To provide another example with reference to FIG. 5C, the image may represent an image captured during a mobile self-checkout system using two affixed fasteners 542A-B. In such a case, embodiments further include calculating the vertical stretch dimension between the adjacent fasteners 542A-B (544). This vertical stretch dimension may be calculated in addition to, or instead of, the other dimensions associated with the bag 504 as discussed above with reference to FIG. 5A, such as the horizontal compression of the bag 504 (546), the overall vertical bag drop (548), a length of the handles of the bag while hanging due to being stretched in the vertical direction (550), etc.

Regardless of how the various dimensions within the image of the hanging bag 504 are calculated, embodiments include processing unit 302 executing instructions stored in image analysis processing module 311 to identify a range of weights and/or volumes associated with the one or more dimensions calculated in this manner. These calculations may be performed in any suitable manner. For example, the retailer may obtain training data by loading one or more bags used by the retailer with various combinations of different products, and measuring changes in bag dimensions when containing products of varying weights and/or volumes to generate a set of training classifiers. When the one or more bag dimensions are calculated from a subsequent image analysis, embodiments may include back-end component 300 correlating these calculated dimensions to the set of training classifiers to match the calculated dimensions to a range of expected weights and/or volumes.

To provide another example, the values for the depth dimension of the bag 504 may be assumed to be a constant value or some range of values or, in embodiments in which a three-dimensional image analyses are implemented, the depth dimension of the bag 504 may be obtained via image analysis. Using this information, one or more calculated dimensions of the bag 504 may be mapped to sets of training classifiers matching those dimensions, which is in turn associated with a range of expected volumes.

In various embodiments, the ranges of expected weights and/or volumes may be established in any suitable manner as preferred by the retailer. For example, the sets of training classifiers may include a range of weights or volumes, or both, as the case may be, associated with various dimensions. To provide another example, the range of values may be represented as an error tolerance associated with collecting the test data. Continuing this example, one or more of the aforementioned dimensions may be associated with a particular cumulative bag weight W and/or Volume V, with an error of ±E %. In this scenario, the range of expected weights would be the entire range of weight and/or volume values within the error range.

To provide yet another example, a maximum weight and/or volume may be established based upon known properties of the bag (e.g., a maximum weight and/or volume capacity), and the mobile self-checkout verification may be based upon whether the weight and/or volume of the scanned products exceed these maximum values. These embodiments may be particularly useful, for example, when image analysis is not desired or deemed necessary by the retailer. For instance, by using a maximum weight and/or volume capacity of a bag, a mobile self-checkout may be verified without performing an image analysis by determining whether the cumulative weight and/or volume of the scanned products exceeds one, or both, of these metrics.

Additionally or alternatively, the retailer may specify a minimum bag weight and/or volume to allow mobile self-checkouts to occur, and otherwise not verifying the mobile self-checkout process. In such a case, the expected range of weights and/or volumes may be represented between 0 (or an applicable minimum, if established) weight and/or volume up to the maximum weight and/or volume.

In any event, embodiments include the retailer establishing various rules, priorities, and combinations of these various calculated metrics that are compared to information obtained from the scanned product data. The comparisons of one or more of these various metrics may then be used to verify whether a bag actually contains the scanned products, such that a mobile self-checkout session can be verified and the customer notified accordingly. These rules are further discussed below.

In an embodiment, checkout confirmation and notification module 313 is a portion of memory unit 306 configured to store instructions, that when executed by processing unit 302, cause processing unit 302 to perform various acts in accordance with the applicable embodiments as described herein. In various embodiments, these instructions may facilitate processing unit 302 performing comparisons between any suitable number and/or type of metrics obtained from the product information (e.g., via UPC lookup) and the expected metrics that are calculated using the dimensions derived via the aforementioned image analyses.

In various embodiments, checkout confirmation and notification module 313 may include instructions specifying how comparisons are performed and how a customer is informed as a result of these comparisons. For instance, checkout confirmation and notification module 313 may contain rules, logic, and/or code indicating which particular metrics are to be compared, a prioritization that indicates whether certain comparisons should be weighted more heavily than others, how to resolve inconsistencies between various different comparisons, etc.

To provide an illustrative example, processing unit 302 may execute instructions stored in checkout confirmation and notification module 313 to compare the aforementioned total weight of the scanned products #1, #2, #5, #6, and #15 (about 6 pounds) to a range of expected weights that have been derived from the one or more calculated dimensions via image analysis of the image of a hanging bag, as discussed above. Continuing this example, if the range of expected weights is calculated to be between 5.8-6.8 pounds, then this comparison would result in the mobile self-checkout being verified, as the total weight of the scanned products is commensurate with the expected range of weight values for a bag containing each of these scanned products. In such a case, the back-end component 300 may cause a notification to be transmitted to the mobile computing device (e.g., via communication unit 304) from which the scanned product information and captured image data was received (e.g., mobile computing device 102, as shown in FIG. 1) and/or a retailer computing device (e.g., retail computing device 108, as shown in FIG. 1). This notification may inform the user and/or store employee, for example, that the transaction was successful, that the user's account was charged and the items have been paid for, that the user may now exit the store, display a receipt, etc.

However, if the range of expected weights is calculated to be between 4.5-5.5 pounds, then this comparison would result in the mobile self-checkout not being verified, as the total weight of the scanned products is outside of the expected range of weight values for a bag containing each of these scanned products. In such a case, the back-end component 300 may cause a notification to be transmitted to the mobile computing device (e.g., via communication unit 304) from which the scanned product information and captured image data was received (e.g., mobile computing device 102, as shown in FIG. 1) and/or a retailer computing device (e.g., retail computing device 108, as shown in FIG. 1). In this instance, the notification may inform the user and/or store employee, for example, that the transaction was unsuccessful, that the user's account was not charged, to request assistance (or provide assistance to the user, if directed to a store employee via the retailer computing device), etc.

Additionally or alternatively, processing unit 302 may execute instructions stored in checkout confirmation and notification module 313 to compare other metrics, such as volume, for example. To provide an illustrative example, back-end component 300 may compare the aforementioned total volume of the scanned products #1, #2, #5, #6, and #15 (about 3.3 gallons) to a range of expected volumes that have been derived via image analysis of the image of a hanging bag, as discussed above. Continuing this example, if the range of expected volumes encompasses this volume of 3.3 gallons, then the mobile self-checkout would be verified; otherwise, the mobile self-checkout would not be verified. Again, in any event, embodiments include the customer and/or store employee being notified accordingly.

In various embodiments, a retailer may define the various rules used to verify mobile self-checkouts such that some mobile self-checkouts compare a single type of metric (e.g., weight or volume), while other mobile self-checkouts compare more than one type of metric (e.g., weight and volume). These latter embodiments may be particularly useful, for example, when additional verification is sought for the mobile self-checkout process. To provide an illustrative example, both the total weight and the total bag volume, as discussed above, may be compared to their respective expected range of values, and the mobile self-checkout considered verified when both of these metrics fall within their expected ranges.

To provide another illustrative example, embodiments include processing unit 302 executing instructions stored in checkout confirmation and notification module 313 to compare or otherwise identify other types of metrics to verify mobile self-checkouts, which may be done as a separate verification or in combination with others. For instance, product information may indicate the color and/or shape of a scanned product, as mentioned above. Therefore, embodiments may include the back-end component 300 additionally or alternatively analyzing the hanging bag image and verifying the mobile self-checkout based upon whether these color and/or shapes are visible within the image.

In various embodiments, the instructions stored in checkout confirmation and notification module 313 may enable the back-end component 300 to utilize different sets of metrics, different combinations of metrics, and/or different ranges of metrics to perform mobile self-checkout verifications based upon certain conditions being met. These conditions may be based upon, for example, information in a user's profile, the total cost of a transaction, the total number of products, a retail store location, etc. In this way, additional or alternate comparisons may be made with different ranges and/or different types of metrics to enhance the security of the overall mobile self-checkout process based upon various factors that the retailer may adjust as desired.

To provide an illustrative example, back-end component 300 may compare bag weights or bag volumes for some retail store locations, while comparing both bag weight and bag volume for other retail store locations. Furthermore, the ranges of expected metric values may change based upon the aforementioned conditions. In other words, a retailer may control the range of expected values of weights and/or volumes to "tighten up" (i.e., narrow the range) of certain mobile self-checkout processes to exert additional control over the verification process.

Moreover, the ranges of expected metric values may be adjusted based upon the total weight and/or total volume of the scanned products. For example, the calculation of expected weights and volumes may be more accurate for larger values, as these larger values result in a more marked change in the various dimensions used for such calculations. Therefore, a retailer may require, for a mobile self-checkout to be verified, that narrower ranges be met for bags having a higher weight and/or volume compared to lower ones.

Figure 6:
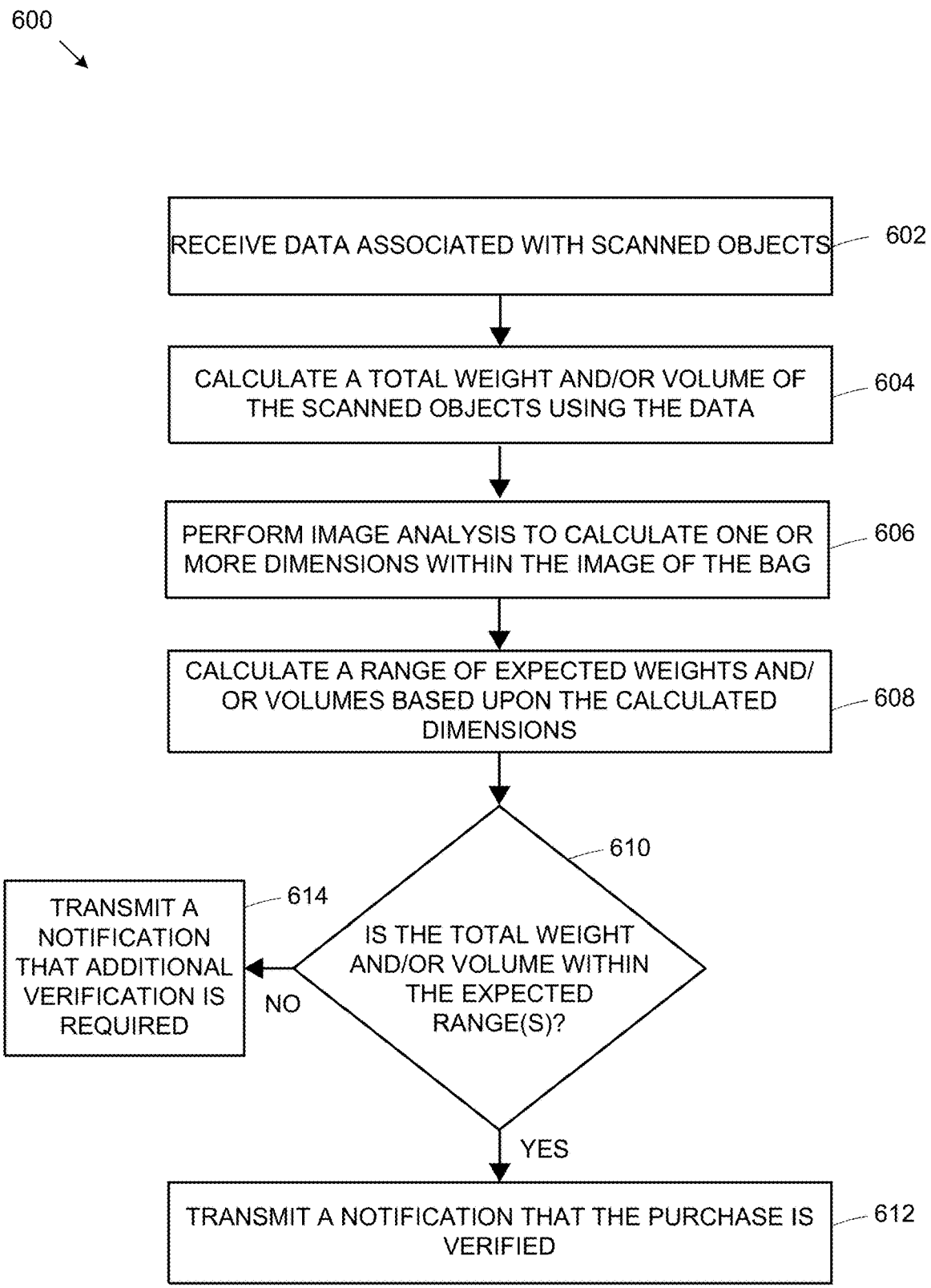
FIG. 6 illustrates a method flow 600, according to an embodiment.

FIG. 6 illustrates a method flow 600, according to an embodiment. In an embodiment, one or more portions of method 600 (or the entire method 600) may be implemented by any suitable device, and one or more portions of method 600 may be performed by more than one suitable device in combination with one another. For example, one or more portions of method 600 may be performed by mobile computing device 200 and/or back-end component 300, as shown in FIGS. 2 and 3. In an embodiment, method 600 may be performed by any suitable combination of one or more processors, applications, algorithms, and/or routines. For example, method 600 may be performed via processing unit 302 executing instructions stored in mobile self-checkout analysis application 307.

Method 600 may start when one or more processors receive data associated with scanned objects (block 602). In an embodiment, this may include receiving product data transmitted from a mobile computing device in response to the mobile computing device scanning barcodes during a mobile self-checkout process (block 602). This data may include, for example, UPCs or other information uniquely identifying each scanned product, as well as images of a bag hanging from an affixed fastener that should contain each of the scanned products.

Method 600 may include one or more processors calculating a total weight and/or total volume of the scanned objects using the product data (block 604). This may include, for example, referencing product data using UPCs or other information uniquely identifying each scanned product to determine each product's weight, dimensions, and/or volume (block 604).

Method 600 may include one or more processors performing image analysis on the received image of the hanging bag to calculate one or more dimensions within the image (block 606). This may include, for example, calculating one or more dimensions that are indicative of a cumulative weight of the bag containing the one or more scanned products, a vertical stretching dimension between two adjacent affixed fasteners, a spring extension length, etc., as discussed herein with reference to FIGS. 5A-5C (block 606).

Method 600 may include one or more processors calculating a range of expected weights and/or volumes based upon the calculated (block 606) dimensions (block 608). Again, this calculation may utilize one or more techniques such as correlation to a set of classifiers, for example, that are in turn associated with respective ranges of weights and/or volumes (block 608).

Method 600 may include one or more processors determining whether the total weight and/or volume of all scanned products is within the calculated range of expected weights and/or volumes (block 610). Again, various embodiments include one, or both, of weight and volume metrics being compared in this manner, along with other suitable metrics such as product color and/or shape (block 610).

If the total weight and/or volume of all scanned products is within the calculated range of expected weights and/or volumes (block 610), then method 600 may include one or more processors transmitting a notification that the purchase is verified (block 612). Again, this may include a notification to the customer and/or store employee indicating that the transaction was successful, that the user's account was charged and the items paid for, that the user may now exit the store, display a receipt, etc. (block 612).

However, if the total weight and/or volume of all scanned products is not within the calculated range of expected weights and/or volumes (block 610), then method 600 may include one or more processors transmitting a notification that additional verification is required (block 614). This may include, for example, a notification informing the user and/or store employee that the transaction was unsuccessful, that the user's account was not charged, to request assistance (or provide assistance to the user, if directed to a store employee via the retailer computing device), etc. (block 614).

Technical Advantages

The embodiments described herein may be implemented as part of one or more computer components, such as a mobile computing device and/or one or more back-end components. Furthermore, the embodiments described herein may be implemented as part of a computer network architecture that facilitates communications between various other devices and/or components. Thus, the embodiments described herein address and solve issues of a technical nature that are necessarily rooted in computer technology.

For instance, embodiments include identifying scanned product information to calculate a total volume and/or weight of scanned products to be purchased. Moreover, the embodiments describe performing image analysis to calculate specific dimensions within an image of a hanging bag filled with the scanned products. Using these dimensions, ranges of expected weights and/or volumes may be calculated and compared to the total volume and/or weight of the combined scanned products to be purchased. In doing so, the embodiments overcome issues associated with mobile self-checkout systems by actively verifying whether physical expectations associated with a bagged order match what is scanned by the customer. Without the improvements suggested herein, a retailer would potentially suffer from losses due to a lack of order verification. Additionally, by using image analysis to determine various metrics for mobile self-checkout verification, the embodiments leverage computer vision and other advantageous aspects of image processing that could not be otherwise calculated and used in the manner described herein.

Additionally, the embodiments described herein allow for mobile self-checkout verification to be performed in a number of different ways based upon various conditions being satisfied. In doing so, the embodiments not only provide a retailer with a great deal of customization, but also address issues related to processing usage. For example, by allowing a retailer to customize the verification process, a back-end component may advantageously utilize less processing resources and time for single-metric type comparisons versus multi-metric type comparisons. Therefore, the embodiments also help address issues related to controlling processing resources and regulating power usage while addressing other issues related to mobile self-checkout systems, such as the risk of potential theft.

ADDITIONAL CONSIDERATIONS

As used herein, the term "store," or "retailer" may include, for example, a single outlet or a plurality of outlets affiliated with one or more entities that are licensed or otherwise authorized to sell merchandise, to dispense prescribed pharmaceutical products such as drugs, medicaments, durable medical equipment, etc. The one or more entities may be located, for example, in geographic locations separate from one another, in different areas of the same city, or in different states, countries, etc. The retail stores may include, for example, one or more of a conventional retail store, space within a location operated by another commercial or not-for-profit entity (e.g., within a discount store, hospital, school, nursing home, etc.), an outlet in proximity with a warehouse or distribution center, a call-in pharmacy, a long-term care pharmacy, a workplace/on-site pharmacy, a specialty pharmacy, etc. The pharmacy may be commercial or not-for-profit, and may provide or vend other products in addition to the prescribed pharmaceutical products.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A method, comprising:
receiving, by one or more processors, data from a mobile computing device in response to the mobile computing device scanning at least one barcode that is associated with one or more objects;
calculating, by one or more processors, a total weight of the one or more objects based upon the received data;
receiving, by one or more processors, an image from the mobile computing device, the image including a bag containing the one or more objects while hanging from an affixed fastener, the image being separate from the data received in response to the mobile computing device scanning the at least one barcode;
performing, by one or more processors, image analysis of the image of the bag to calculate one or more dimensions that are indicative of a cumulative weight of the bag containing the one or more objects;
calculating, by one or more processors, a range of expected weights associated with the one or more dimensions, wherein the total weight and the range of expected weights are calculated without the use of a scale; and
transmitting, by one or more processors, a notification to the mobile computing device based upon whether the total weight of the one or more objects is within the range of expected weights.

2. The method of claim 1, wherein the one or more dimensions are further indicative of a cumulative volume of the bag containing the one or more objects, and
wherein the act of transmitting the notification to the mobile computing device comprises:
transmitting the notification to the mobile computing device further based upon whether a calculated total volume of the one or more objects is within a range of expected volumes associated with the one or more dimensions.

3. The method of claim 1, wherein the bag is associated with a maximum volume, and
wherein the act of transmitting the notification to the mobile computing device further comprises:
transmitting the notification to the mobile computing device further based upon whether the calculated total volume of the one or more objects is less than or greater than the maximum volume.

4. The method of claim 1, wherein the image of the bag hanging by the affixed fastener includes the bag hanging by one or more hooks next to a labeled dimensional chart, and
wherein the act of performing the image analysis further comprises performing the image analysis to calculate the one or more dimensions using dimensions provided by the labeled dimensional chart.

5. The method of claim 1, wherein the one or more calculated dimensions include dimensions associated with the bag stretching in a vertical direction due to the cumulative weight of the bag containing the one or more objects.

6. The method of claim 1, wherein the one or more calculated dimensions include dimensions associated with a horizontal compression of the bag due to the cumulative weight of the bag containing the one or more objects.

7. The method of claim 1, wherein:
the image of the bag hanging by the affixed fastener includes the bag hanging by a spring-loaded hook next to a labeled dimensional chart,
the act of performing the image analysis further comprises performing the image analysis to determine an extension length of the spring-loaded hook due to the cumulative weight of the bag containing the one or more objects, and
the act of calculating the range of expected weights includes calculating the range of expected weights based upon the extension length of the spring-loaded hook using dimensions provided by the labeled dimensional chart.

8. A computing device, comprising:
a communication unit configured to receive (i) data from a mobile computing device in response to the mobile computing device scanning at least one that is associated with one or more objects, and (ii) an image from the mobile computing device, the image including a bag containing each of the one or more objects while hanging from an affixed fastener, the image being separate from the data received in response to the mobile computing device scanning the at least one barcode; and a processing unit configured to:
calculate a total weight of each of the one or more objects based upon the received data;
perform image analysis of the image of the bag to calculate one or more dimensions that are indicative of a cumulative weight of the bag containing the one or more objects; and
calculate a range of expected weights associated with the one or more dimensions, wherein the total weight and the range of expected weights are calculated without the use of a scale,
wherein the communication unit is further configured to transmit a notification to the mobile computing device based upon whether the total weight of the one or more objects is within the range of expected weights.

9. The computing device of claim 8, wherein the one or more dimensions are further indicative of a cumulative volume of the bag containing the one or more objects, and
wherein the communication unit is further configured to transmit the notification to the mobile computing device further based upon whether a calculated total volume of the one or more objects is within a range of expected volumes associated with the one or more dimensions.

10. The computing device of claim 8, wherein the bag is associated with a maximum volume, and
wherein the communication unit is further configured to transmit the notification to the mobile computing device based upon whether the total volume of the one or more objects is less than or greater than the maximum volume.

11. The computing device of claim 8, wherein the image of the bag hanging by the affixed fastener includes the bag hanging by one or more hooks next to a labeled dimensional chart, and
wherein the processing unit is further configured to perform the image analysis to calculate the one or more dimensions using dimensions provided by the labeled dimensional chart.

12. The computing device of claim 8, wherein the one or more calculated dimensions include dimensions associated with the bag stretching in a vertical direction due to the cumulative weight of the bag containing the one or more objects.

13. The computing device of claim 8, wherein the one or more calculated dimensions include dimensions associated with a horizontal compression of the bag due to the cumulative weight of the bag containing the one or more objects.

14. The computing device of claim 8, wherein the image of the bag hanging by the affixed fastener includes the bag hanging by a spring-loaded hook next to a labeled dimensional chart,
wherein the processing unit is further configured to perform the image analysis to determine an extension length of the spring-loaded hook due to the cumulative weight of the bag containing the one or more objects, and to calculate the range of expected weights based upon the extension length of the spring-loaded hook using dimensions provided by the labeled dimensional chart.

15. A non-transitory computer readable medium having instructions stored thereon that, when executed by one or more processors, cause the one or more processors to:

receive data from a mobile computing device in response to the mobile computing device scanning at least one barcode that is associated with one or more objects;
calculate a total weight of each of the one or more objects based upon the received data;
receive an image from the mobile computing device, the image including a bag containing each of the one or more objects while hanging from an affixed fastener, the image being separate from the data received in response to the mobile computing device scanning the at least one barcode;
perform image analysis of the image of the bag to calculate one or more dimensions that are indicative of a cumulative weight of the bag containing the one or more objects;
calculate a range of expected weights associated with the one or more dimensions, wherein the total weight and the range of expected weights are calculated without the use of a scale; and
transmit a notification to the mobile computing device based upon whether the total weight of the one or more objects is within the range of expected weights.

16. The non-transitory computer readable medium of claim 15, wherein the one or more dimensions are further indicative of a cumulative volume of the bag containing the one or more objects, and
wherein the instructions to transmit the notification to the mobile computing device further include instructions that, when executed by the one or more processors, cause the one or more processors to transmit the notification to the mobile computing device further based upon whether a calculated total volume of the one or more objects is within a range of expected volumes associated with the one or more dimensions.

17. The non-transitory computer readable medium of claim 15, wherein the bag is associated with a maximum volume, and
wherein the instructions to transmit the notification to the mobile computing device further include instructions that, when executed by the one or more processors, cause the one or more processors to transmit the notification to the mobile computing device based upon whether the total volume of the one or more objects is less than or greater than the maximum volume.

18. The non-transitory computer readable medium of claim 15, wherein the image of the bag hanging by the affixed fastener includes the bag hanging by one or more hooks next to a labeled dimensional chart, and
wherein the instructions to perform image further include instructions that, when executed by the one or more processors, cause the one or more processors to calculate the one or more dimensions using dimensions provided by the labeled dimensional chart.

19. The non-transitory computer readable medium of claim 15, wherein the one or more calculated dimensions include one or more of (i) dimensions associated with the bag stretching in a vertical direction due to the cumulative weight of the bag containing the one or more objects, and (ii) dimensions associated with a horizontal compression of the bag due to the cumulative weight of the bag containing the one or more objects.

20. The non-transitory computer readable medium of claim 15, wherein:
the image of the bag hanging by the affixed fastener includes the bag hanging by a spring-loaded hook next to a labeled dimensional chart, the instructions to perform image further include instructions that, when executed by the one or more processors, cause the one or more processors to determine an extension length of the spring-loaded hook due to the cumulative weight of the bag containing the one or more objects, and the instructions to calculate the range of expected weights further include instructions that, when executed by the one or more processors, cause the one or more processors to calculate the range of expected weights based upon the extension length of the spring-loaded hook using dimensions provided by the labeled dimensional chart.

\* \* \* \* \*